Patented Oct. 7, 1947

2,428,740

UNITED STATES PATENT OFFICE 2,428,740

SEPARATION OF VEGETABLE PIGMENTS

Thomas Barton Mann, Upton, Wirral, England

No Drawing. Application October 29, 1943, Serial No. 508,248. In Great Britain December 12, 1942

5 Claims. (Cl. 260—666)

The invention relates to the separation or concentration of vegetable pigments or associated materials such as provitamins and especially to their separation from each other or from impurities or other materials.

According to the invention provitamins or vegetable pigments such as carotenoids (lipochromes), flavins (lyochromes) or chlorophylls, are treated with bone meal; one or more of the components is adsorbed by the bone meal and may be recovered by elution with a suitable solvent. Thus, when a solution of a mixture of vegetable pigments is treated with bone meal, the desired pigment may be adsorbed or may be present in the filtrate, depending on the nature of the pigment and the impurity and the solvent employed.

We prefer to use bone meal obtained by removing gelatine and oil and then purifying further to remove sterols and residual oil by extraction with petrol-ether-acetone. If water-soluble pigments are to be treated, it is desirable to remove brown pigments from the bone meal by a further purification with pyridine and/or boiling water.

*Example 1.—Treatment of grass to produce β-carotene and chlorophyll*

Grind 5 parts by weight of fresh grass (poa Annua) with 20 to 30 parts of anhydrous sodium sulphate and 20 parts of sand until flour-like in consistency. The whole mixture is extracted with petrol (60 parts by weight) which is boiled and refluxed through a porous receptacle holding the grass for 1 hour. The petrol solution is then passed through a column of 25 parts of purified bone meal. The column is then washed with a further 150 parts of petrol until the filtrate runs colourless. β-carotene (71 milligrams per kilogram of fresh grass) is obtained from the filtrate. The column may then be eluted by passage of ethers, acetone, or alcohols (about 100 parts by weight) and a petrol-soluble chlorophyll may be recovered from the liquid: finally the column may be regenerated by eluting with petrol.

As an alternative procedure fresh grass may be extracted with a mixture of petrol, acetone and ether, either a combination of these solvents or any two of them may be used, and the evaporated extract may be treated with petrol to obtain a solution which is then filtered through purified bone meal.

In addition to grass, the process is applicable to tubers or roots which may be dried, or ground, or pressed to remove moisture, or otherwise suitably prepared for extraction, and then extracted with petrol, or acetone, or ether, or benzene, or trichlorethylene, or other suitable organic solvent, or mixtures of such organic solvents, and the evaporated extract may be treated with petrol, and prior to filtration through bone meal may be filtered by other means, or the suspended matter may be centrifugalised to effect its removal, or the petrol may be decanted from the suspended matter.

*Example 2.—Treatment of roots to obtain β-carotene*

When dealing with carrots, or other roots containing vegetable pigments, the tubers or roots with or without the addition of leaves or stalks, may be extracted after grinding and drying, or pressing to remove moisture, or in a fresh state, and after the solvent has been evaporated the residue in petrol may eventually be filtered through bone meal, which will permit the passage of the pro-vitamin A carotenes, alpha, beta, and gamma carotene, and the xanthophylls and chlorophylls will be retained adsorbed on the bone meal. These pigments may then be eluted with acetone, ether, alcohol or benzene and may be treated with alkali as described hereafter for leaf material, for the separation of chlorophyllins from xanthophylls.

Thus 25 grams of dried carrots ground with sand (ca. 25 grams) and extracted with 150 ccs. of benzene, $C_6H_6$, gave 0.53 gram of extract. This extract was dissolved in 200 ccs. petrol, and passed over a column of purified bone meal (100 grams). Further 500 ccs. petrol were then passed through. Yield in filtrate:

Alpha carotene, 2,750 mgms. per kilogram of original extract.
Beta carotene, 10,780 mgms. per kilogram of original extract.

Elution of column with 200 ccs. acetone yielded chlorophylls and xanthophylls. After removing chlorophylls by conversion to potassium chlorophyllins:

Yield of xanthophyll, 510 mgms. per kilogram of original extract.

*Example 3.—Obtaining chlorophyllins, xanthophylls and β-carotene*

Leaf material, whether dried, or in a fresh state, may be extracted with acetone or ether or mixtures of either or both of these solvents with petrol, and the evaporated extract may be treated to convert the chlorophylls to their alkali salts e. g. by mixing and agitation with a small quantity of alcoholic potash or by heating with alcoholic potash.

Thus 50 grams of dried grass were extracted with 250 ccs. of petrol, acetone and ether (3:1:1). The solvents were evaporated and 15 ccs. of 30% methyl alcoholic potash added to extract. The liquid was refluxed with gentle heat for 15 minutes, then the alcohol was distilled off and the extract taken up with 100 ccs. of ether. The solution was passed through a filter fitted above a purified bone meal column (100 grams of bone meal) and ether-insoluble chlorophyllins were filtered off.

Yield of crude K chlorophyllin, 4.5 grams.

A further 250 ccs. ether were passed through the column, and the filtrate containing beta-carotene and xanthophylls was freed from ether by distillation. The residue was taken up in 100 ccs. of petrol and passed over another column containing 50 grams of bone meal. The $\beta$-carotene was washed through the column with a further 150 ccs. petrol.

Yield, 310 mgms. $\beta$-carotene per kilogram of original dried grass.

The column was then eluted with 150 ccs. acetone.

Yield of xanthophylls in acetone, 330.5 mgms. per kilogram of original dried grass.

Example 4.—Flavins

Digest leaf material (grass) with methanol. Pass extract over column of bone meal. Elute with methanol till no more colour washed off. Elute water-soluble flavins or flavones with water and/or pyridine.

Alternatively use 90% methanol (10% water) instead of water to obtain flavins soluble therein.

Example 5.—Chlorophyll 20 grams of dried grass were extracted with 150 ccs. petrol for 30 minutes. The petrol extract was passed through a purified bone meal column (100 grams of bone meal). A further quantity of petrol was passed through the column until no more colour was washed off. The chlorophyll was eluted with acetone, 150 ccs. which was removed by distillation.

Weight of chlorophyll, 0.3992 gram.

I declare that what I claim is:

1. The process of treating grass which includes the steps of extracting it with an organic solvent for pigments therein and passing the solution thus obtained over bone meal.

2. In the treatment of material containing carotene and another non-mycological vegetable adsorbable on bone meal pigment, the process which consists in bringing said carotene and said other non-mycological vegetable pigment into solution in a petroleum spirit and bringing the solution thus obtained into contact with bone meal whereby the treated solution is enriched in carotene by adsorption of said other pigment on the bone meal.

3. Process of treating vegetable material containing chlorophyll and carotene for the recovery of carotene which consists in extracting said material with a volatile organic solvent to bring chlorophyll and carotene into solution, evaporating the solvent from the solution thus obtained, dissolving the residue in a volatile petroleum solvent, bringing the solution thus obtained into contact with bone meal, collecting a filtrate containing the pigment carotene in solution and recovering carotene from the solution by distilling off the solvent.

4. Process for the separation of carotene from vegetable material containing non-mycological vegetable pigments such as chlorophyll, which consists in extracting the material with a volatile hydrocarbon solvent, evaporating the extract, adding alcoholic potash to convert the chlorophyll into potassium chlorophyllin, extracting the remaining pigments from said potassium chlorophyllin solution with ether, evaporating the pigment solution to dryness, treating the residue with petrol to dissolve it, passing the resultant solution over bone meal, washing out the bone meal with more petrol, collecting a filtrate containing the pigment carotene in solution and evaporating the solution to yield $\beta$-carotene.

5. Process for obtaining $\beta$-carotene from dried grass, which consists in extracting said grass with petrol, treating the petrol solution with bone meal, collecting a filtrate containing the pigment carotene in solution, evaporating the filtrate and recovering $\beta$-carotene from the evaporated product.

THOMAS BARTON MANN.

REFERENCES CITED

The following references are of record in the file of this patent:

UNITED STATES PATENTS

| Number | Name | Date |
|---|---|---|
| 330,075 | Wemple | Nov. 10, 1885 |
| 2,282,969 | King | May 12, 1942 |

OTHER REFERENCES

Strain Chromatographic Adsorption Analysis—Interscience Publishers, Inc., N. Y., 1942, pages 128–146.

Smith et al., "Water Works Engineering," vol. 90 (Nov. 10, 1937) pages 1600–1603.

Bulletin 173—La. State University (March 1920), pages 4 to 33.